(12) United States Patent
Jansen

(10) Patent No.: US 8,045,927 B2
(45) Date of Patent: Oct. 25, 2011

(54) SIGNAL DETECTION IN MULTICARRIER COMMUNICATION SYSTEM

(75) Inventor: Kaj Jansen, Salo (FI)

(73) Assignee: Nokia Corporation, Espoo (FI)

( * ) Notice: Subject to any disclaimer, the term of this patent is extended or adjusted under 35 U.S.C. 154(b) by 1078 days.

(21) Appl. No.: 11/412,472

(22) Filed: Apr. 27, 2006

(65) Prior Publication Data

US 2007/0254594 A1 Nov. 1, 2007

(51) Int. Cl.
*H04B 17/00* (2006.01)

(52) U.S. Cl. .................. 455/67.13; 455/226.1

(58) Field of Classification Search ........... 455/67.13
See application file for complete search history.

(56) References Cited

U.S. PATENT DOCUMENTS

| | | | | |
|---|---|---|---|---|
| 5,444,697 A * | 8/1995 | Leung et al. | .................. | 370/207 |
| 5,852,630 A | 12/1998 | Langberg et al. | | |
| 6,122,327 A * | 9/2000 | Watanabe et al. | .................. | 375/316 |
| 6,211,924 B1 | 4/2001 | Patel et al. | | |
| 6,256,355 B1 * | 7/2001 | Sakoda et al. | .................. | 375/259 |
| 6,310,896 B1 | 10/2001 | Langberg et al. | | |
| 6,411,662 B1 * | 6/2002 | Sakoda et al. | .................. | 375/340 |
| 6,574,283 B1 * | 6/2003 | Sakoda et al. | .................. | 375/262 |
| 6,590,860 B1 * | 7/2003 | Sakoda et al. | .................. | 370/203 |
| 6,631,169 B1 * | 10/2003 | Wu et al. | .................. | 375/305 |
| 6,658,063 B1 * | 12/2003 | Mizoguchi et al. | .................. | 375/260 |
| 6,711,123 B1 | 3/2004 | Taira | | |
| 6,757,550 B1 * | 6/2004 | Yoneyama et al. | .................. | 455/525 |
| 6,922,549 B2 * | 7/2005 | Lyons et al. | .................. | 455/67.13 |
| 6,924,763 B2 * | 8/2005 | Poullin | .................. | 342/159 |
| 6,954,643 B2 * | 10/2005 | Petrus | .................. | 455/437 |
| 6,999,025 B2 * | 2/2006 | Poullin | .................. | 342/159 |
| 7,043,242 B2 | 5/2006 | Kuiti et al. | | |
| 7,047,042 B2 * | 5/2006 | Komara et al. | .................. | 455/561 |
| 7,079,480 B2 * | 7/2006 | Agee | .................. | 370/204 |
| 7,113,557 B2 * | 9/2006 | Kaku et al. | .................. | 375/346 |
| 7,251,282 B2 * | 7/2007 | Maltsev et al. | .................. | 375/260 |
| 7,310,503 B2 * | 12/2007 | Ido | .................. | 455/140 |
| 7,362,832 B2 | 4/2008 | Yoshida | | |
| 7,366,089 B2 * | 4/2008 | Tehrani et al. | .................. | 370/208 |
| 7,397,841 B2 * | 7/2008 | Suzuki | .................. | 375/147 |
| 7,430,193 B2 * | 9/2008 | Kim et al. | .................. | 370/338 |
| 7,430,257 B1 * | 9/2008 | Shattil | .................. | 375/347 |

(Continued)

FOREIGN PATENT DOCUMENTS

EP 1079537 A2 2/2001

(Continued)

OTHER PUBLICATIONS

U.S. Appl. No. 11/412,256, filed Apr. 27, 2006, Jansen.

(Continued)

*Primary Examiner* — Duc Nguyen
*Assistant Examiner* — Hai V Nguyen
(74) *Attorney, Agent, or Firm* — Hollingsworth & Funk, LLC

(57) ABSTRACT

A signal detection scheme is provided. According to the provided signal detection scheme, a received signal is correlated in a frequency domain with a reference signal. Additionally, the reception power of the received signal is calculated and the correlation value is normalized with the reception power. Therefore, a single threshold value may be used regardless of the reception power of the received signal when comparing the correlation between the received signal and the reference signal with the threshold value in order to determine whether the received signal is a desired signal or noise.

26 Claims, 2 Drawing Sheets

U.S. PATENT DOCUMENTS

| | | | |
|---|---|---|---|
| 7,433,296 B2* | 10/2008 | Tsuie | 370/203 |
| 7,436,759 B2* | 10/2008 | Hayashi et al. | 370/208 |
| 7,436,897 B2* | 10/2008 | Sanada et al. | 375/267 |
| 7,444,145 B2* | 10/2008 | Diener | 455/423 |
| 7,447,163 B1* | 11/2008 | Thomson et al. | 370/252 |
| 7,486,726 B2* | 2/2009 | Alexander et al. | 375/232 |
| 7,502,311 B2* | 3/2009 | Song et al. | 370/208 |
| 7,505,420 B2 | 3/2009 | Do et al. | |
| 7,515,641 B2* | 4/2009 | Yu et al. | 375/260 |
| 7,545,778 B2* | 6/2009 | Sugar et al. | 370/335 |
| 7,587,016 B2 | 9/2009 | Gaikwad et al. | |
| 7,611,467 B2* | 11/2009 | Zhang | 600/453 |
| 7,675,888 B2* | 3/2010 | Modlin et al. | 370/335 |
| 7,684,503 B2* | 3/2010 | Hayashi | 375/260 |
| 7,684,982 B2* | 3/2010 | Taneda | 704/233 |
| 7,725,081 B2* | 5/2010 | Koga et al. | 455/67.11 |
| 2002/0102941 A1* | 8/2002 | Kuiri et al. | 455/63 |
| 2002/0150109 A1* | 10/2002 | Agee | 370/400 |
| 2002/0160737 A1* | 10/2002 | Crawford | 455/272 |
| 2002/0164968 A1* | 11/2002 | Crawford | 455/277.1 |
| 2002/0196731 A1 | 12/2002 | Laroia et al. | |
| 2003/0002471 A1* | 1/2003 | Crawford et al. | 370/343 |
| 2003/0193998 A1* | 10/2003 | Goldstein et al. | 375/222 |
| 2004/0005018 A1 | 1/2004 | Zhu et al. | |
| 2004/0066331 A1* | 4/2004 | Poullin | 342/378 |
| 2004/0091057 A1* | 5/2004 | Yoshida | 375/260 |
| 2004/0179625 A1 | 9/2004 | Kim | |
| 2004/0190560 A1* | 9/2004 | Maltsev et al. | 370/503 |
| 2004/0229581 A1* | 11/2004 | Mizoguchi et al. | 455/136 |
| 2004/0233841 A1* | 11/2004 | Sanada et al. | 370/210 |
| 2004/0240379 A1* | 12/2004 | Tsuie | 370/210 |
| 2004/0257270 A1* | 12/2004 | Poullin | 342/159 |
| 2004/0264561 A1* | 12/2004 | Alexander et al. | 375/232 |
| 2005/0037722 A1* | 2/2005 | Koga et al. | 455/205 |
| 2005/0095987 A1* | 5/2005 | Lyons et al. | 455/67.13 |
| 2005/0174929 A1* | 8/2005 | Hayashi et al. | 370/208 |
| 2005/0220175 A1* | 10/2005 | Zhou | 375/141 |
| 2005/0220230 A1 | 10/2005 | Fukuda | |
| 2005/0265488 A1* | 12/2005 | Jung | 375/340 |
| 2005/0271026 A1* | 12/2005 | Song et al. | 370/342 |
| 2006/0013285 A1* | 1/2006 | Kobayashi et al. | 375/132 |
| 2006/0013326 A1* | 1/2006 | Yoshida | 375/260 |
| 2006/0013327 A1* | 1/2006 | Sugar et al. | 375/260 |
| 2006/0153283 A1* | 7/2006 | Scharf et al. | 375/148 |
| 2006/0166634 A1* | 7/2006 | Ido | 455/277.1 |
| 2006/0171367 A1* | 8/2006 | Wang | 370/342 |
| 2006/0172713 A1* | 8/2006 | Suzuki et al. | 455/103 |
| 2006/0176093 A1 | 8/2006 | Song et al. | |
| 2006/0209927 A1 | 9/2006 | Khandekar et al. | |
| 2006/0224382 A1* | 10/2006 | Taneda | 704/233 |
| 2006/0294170 A1* | 12/2006 | Matsuoka et al. | 708/300 |
| 2007/0016045 A1* | 1/2007 | Zhang | 600/443 |
| 2007/0019750 A1* | 1/2007 | Gaikwad et al. | 375/260 |
| 2007/0046536 A1* | 3/2007 | Jia et al. | 342/357.12 |
| 2007/0058524 A1* | 3/2007 | Modlin et al. | 370/208 |
| 2007/0098100 A1* | 5/2007 | Charbit et al. | 375/260 |
| 2007/0202902 A1* | 8/2007 | Jansen et al. | 455/502 |
| 2007/0230329 A1* | 10/2007 | Hayashi et al. | 370/210 |
| 2007/0253319 A1* | 11/2007 | Jansen | 370/208 |
| 2007/0254594 A1* | 11/2007 | Jansen | 455/67.13 |
| 2007/0291632 A1* | 12/2007 | Li et al. | 370/203 |
| 2008/0037691 A1* | 2/2008 | Papathanasiou et al. | 375/347 |
| 2008/0043858 A1* | 2/2008 | Lim et al. | 375/260 |
| 2008/0095253 A1* | 4/2008 | Koga et al. | 375/260 |
| 2008/0117998 A1* | 5/2008 | Kato | 375/267 |
| 2008/0211715 A1* | 9/2008 | Feintuch et al. | 342/357.12 |
| 2008/0212659 A1* | 9/2008 | Usui | 375/219 |
| 2008/0228478 A1* | 9/2008 | Hetherington et al. | 704/233 |
| 2008/0285490 A1* | 11/2008 | Mukai et al. | 370/280 |
| 2008/0292036 A1* | 11/2008 | Wilhelmsson et al. | 375/348 |
| 2008/0317150 A1* | 12/2008 | Alexander et al. | 375/260 |
| 2009/0129489 A1 | 5/2009 | Eldar et al. | |
| 2009/0175362 A1* | 7/2009 | Priotti | 375/260 |
| 2009/0201797 A1* | 8/2009 | Suzuki et al. | 370/210 |
| 2009/0225910 A1* | 9/2009 | Suzuki et al. | 375/343 |
| 2009/0290665 A1* | 11/2009 | Yoshida et al. | 375/347 |

FOREIGN PATENT DOCUMENTS

| | | |
|---|---|---|
| EP | 1635494 | 3/2006 |
| GB | 2 345 831 A | 7/2000 |
| WO | WO 00/31659 A1 | 6/2000 |
| WO | WO 2005062728 A2 * | 7/2005 |

OTHER PUBLICATIONS

Office Action dated Jun. 11, 2009 from U.S. Appl. No. 11/412,256, 27 pages.

Office Action Response submitted Jun. 11, 2009 to office action dated Jun. 11, 2009 from U.S. Appl. No. 11/412,256, 15 pages.

Office Action dated Dec. 29, 2009 from U.S. Appl. No. 11/412,256, 16 pages.

Office Action Response submitted Feb. 18, 2010 to office action dated Dec. 29, 2009 from U.S. Appl. No. 11/412,256, 14 pages.

Office Action Response with RCE submitted Mar. 29, 2010 to office action dated Dec. 29, 2009 from U.S. Appl. No. 11/412,256, 20 pages.

* cited by examiner

SIGNAL DETECTION IN MULTICARRIER COMMUNICATION SYSTEM

FIELD

The invention relates generally to signal processing carried out in a radio receiver and particularly to signal detection in a radio receiver capable of receiving and processing signals transmitted according to a multicarrier data transmission scheme.

BACKGROUND

Multicarrier data transmission schemes have been widely studied and, to some degree, employed as high-speed wireless data transmission schemes between two independent communication devices or in wireless telecommunication systems. Such multicarrier data transmission schemes include, for example, Orthogonal Frequency Division Multiplexing (OFDM) scheme. In multicarrier systems, several data symbols are typically transmitted in parallel on a plurality of subcarriers. In order to enable data transmission between a transmitter and a receiver, the receiver must be able to detect a given synchronization or pilot signal transmitted by the transmitter. The synchronization or pilot signal may be attenuated due to fading caused by a radio channel and, thus, may arrive at a very low power level at the receiver. Thus, an efficient signal detection method is needed for detecting synchronization signals and/or pilot signals within a multicarrier signal received in a radio receiver.

In OFDM systems, signal detection may be carried out in either time or frequency domain. The signal detection is typically based on correlation of a received signal processed for detection. The signal detection procedure may be blind or pilot assisted. In blind signal detection, the autocorrelation properties of the received signal, particularly the correlation properties caused by the use of a cyclic prefix, are typically employed. In pilot assisted signal detection, the received signal is correlated with a known signal and if the two signals have enough correlation, the signal is determined to have been detected.

The signal detection is usually based on comparison of a calculated correlation value of the received signal with a threshold value. Since the correlation value is calculated from signal samples having given reception power levels, the correlation value is affected by the reception power of the received signal. Therefore, the threshold value must be calculated by taking into account the reception power of the received signal. In practice, the threshold value has to be calculated for every signal detection procedure. This increases the amount of signal processing and, thus, the complexity of a radio receiver carrying out the signal detection procedure.

BRIEF DESCRIPTION OF THE INVENTION

An object of the invention is to provide an improved solution for signal detection in a radio receiver.

According to an aspect of the invention, there is provided a signal detection method in a radio receiver. The method comprises receiving a first radio signal, transforming the received first radio signal into a frequency domain, selecting specific one or more frequency components of the transformed first radio signal, thereby obtaining a frequency domain representation of a signal located at the selected one or more frequency components, correlating the frequency domain representation of the signal located at the selected one or more frequency components with a reference signal, thereby producing a correlation value describing similarity between the signal located at the selected one or more frequency components and the reference signal, estimating a reception power value for the signal located at the selected one or more frequency components, calculating a decision metric from the correlation value and the reception power value, and determining, on the basis of the decision metric, whether the signal located at the selected one or more frequency components is a desired signal or noise.

According to another aspect of the invention, there is provided a radio receiver. The radio receiver comprises a communication interface configured to receive radio signals, and a processing unit. The processing unit is configured to receive, through the communication interface, a first radio signal, transform the received first radio signal into a frequency domain, select specific one or more frequency components of the transformed first radio signal, thereby obtaining a frequency domain representation of a signal located at the selected one or more frequency components, correlate the frequency domain representation of the signal located at the selected one or more frequency components with a reference signal, thereby producing a correlation value describing similarity between the signal located at the selected one or more frequency components and the reference signal, estimate a reception power value for the signal located at the selected one or more frequency components, calculate a decision metric from the correlation value and the reception power value, and determine, on the basis of the decision metric, whether the signal located at the selected one or more frequency components is a desired signal or noise.

According to another aspect of the invention, there is provided a mobile terminal for use in a wireless communication network. The mobile terminal comprises a radio receiver configured to receive a first radio signal, transform the received first radio signal into a frequency domain, select specific one or more frequency components of the transformed first radio signal, thereby obtaining a frequency domain representation of a signal located at the selected one or more frequency components, correlate the frequency domain representation of the signal located at the selected one or more frequency components with a reference signal, thereby producing a correlation value describing similarity between the signal located at the selected one or more frequency components and the reference signal, estimate a reception power value for the signal located at the selected one or more frequency components, calculate a decision metric from the correlation value and the reception power value, and determine, on the basis of the decision metric, whether the signal located at the selected one or more frequency components is a desired signal or noise.

According to another aspect of the invention, there is provided a computer program distribution medium readable by a computer and encoding a computer program of instructions for executing a computer process for signal detection in a radio receiver. The process comprises receiving a first radio signal, transforming the received first radio signal into a frequency domain, selecting specific one or more frequency components of the transformed first radio signal, thereby obtaining a frequency domain representation of a signal located at the selected one or more frequency components, correlating the frequency domain representation of the signal located at the selected one or more frequency components with a reference signal, thereby producing a correlation value describing similarity between the signal located at the selected one or more frequency components and the reference signal, estimating a reception power value for the signal located at the selected one or more frequency components, calculating a decision metric from the correlation value and the reception power value, and determining, on the basis of the decision metric, whether the signal located at the selected one or more frequency components is a desired signal or noise.

The invention provides several advantages. The invention enables a robust detection of a signal that has been transmitted on given subcarriers simultaneously with another signal or other signals transmitted on other subcarriers. Additionally, the invention enables simplified signal detection regardless of the reception power level of the signal being processed for detection.

LIST OF DRAWINGS

In the following, the invention will be described in greater detail with reference to the embodiments and the accompanying drawings, in which FIG. 1 illustrates a block diagram of an exemplary communication system in which embodiments of the invention may be implemented;

DESCRIPTION OF EMBODIMENTS

Figure 1:
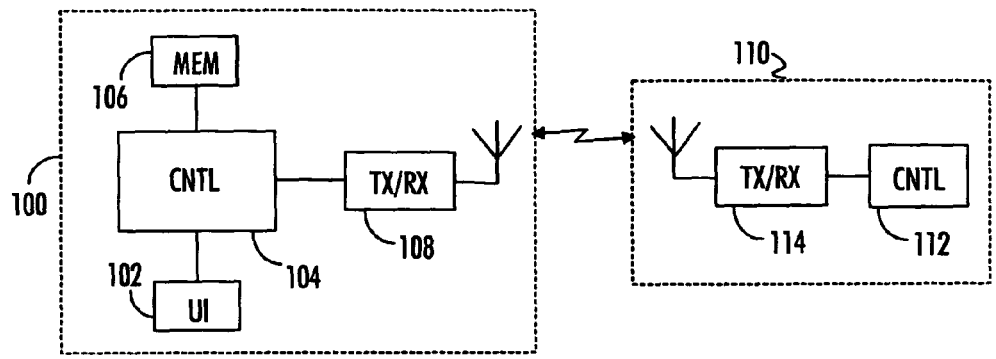

With reference to FIG. 1, examine an example of a communication system in which embodiments of the invention can be applied. The communication system may be a mobile communication system, such as Universal Mobile Telecommunications system (UMTS), Wireless Local Area Network (WLAN), etc. Alternatively, the communication system may comprise two independent communication devices, for example two mobile phones communicating with each other wirelessly. The communication system may utilize a multicarrier data transmission scheme, such as Orthogonal Frequency Division Multiplexing (OFDM).

With reference to FIG. 1, examine an example of the structure of a radio receiver 100 to which embodiments of the invention can be applied. The radio receiver 100 in FIG. 1 is a radio receiver 100 capable of wireless communications and capable of at least receiving information transmitted through a radio channel. The radio receiver 100 may be capable of receiving information transmitted according to the OFDM technique. The radio receiver 100 may, for example, be a personal mobile communication or information-processing device, such as a computer, a PDA (Personal Digital Assistant), or a mobile terminal of a wireless communication system. The radio receiver 100 may also be an element of a communication network, such as a base station of a mobile communication system or an access point to a WLAN. Furthermore, the radio receiver may be a component of an electronic device, being configured to receive radio signals and process them according to embodiments of the invention.

The radio receiver 100 comprises a communication interface 108 for receiving information transmitted through the radio channel. The communication interface 108 may be a reception unit configured to receive information transmitted by using any communication technique stated above. The communication interface 108 may be configured to process received information signals to a certain degree. The communication interface 108 may be configured to filter and amplify the received information signals as well as to convert the analog information signals into a digital form. In addition to receiving information signals, the communication interface 108 may be configured to transmit information signals through the radio channel.

The radio receiver 100 further comprises a processing unit 104 configured to control operations of the radio receiver 100. The processing unit 104 may be configured to process information received through the communication interface 108. In particular, the processing unit 104 may be configured to perform digital signal processing algorithms on the received information in order to reliably detect a transmitted information signal. The processing unit 104 may be implemented with a digital signal processor provided with suitable software embedded on a computer readable medium, or with separate logic circuits, for example with ASIC (Application Specific Integrated Circuit).

The radio receiver 100 may further comprise a memory unit 106 for storing information. The memory unit 106 may be of any non-volatile memory type. The memory unit 106 may store software necessary for the operation of the radio receiver but also specific parameters necessary for the reception and processing of radio signals.

The radio receiver 100 may additionally comprise a user interface 102 for interaction between the radio receiver and a user of the radio receiver 100. The user interface 102 may include an input device such as a keyboard or a keypad, a display device, a microphone and a loudspeaker.

The radio receiver 100 may have a communication connection with a radio transmitter 110 comprising a communication interface 114 and a processing unit 112. The radio transmitter 110 may have the capability to transmit information according to the OFDM technique, i.e. have the capability to transmit multicarrier OFDM signals.

Next, signal detection carried out in the radio receiver 100 according to an embodiment of the invention will be described with reference to FIGS. 2 to 5.

Figure 2:
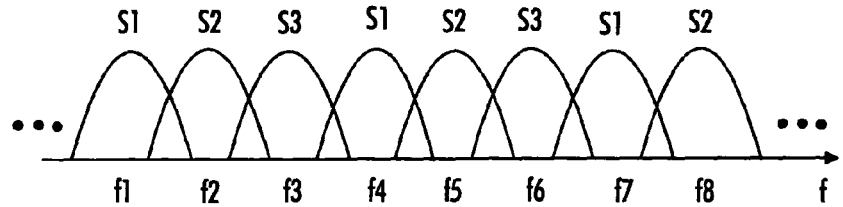
FIG. 2 illustrates an example of the frequency spectrum of a multicarrier signal received in a radio receiver according to an embodiment of the invention.

FIG. 2 illustrates an example of the frequency domain representation of an OFDM signal which may be received in the radio receiver 100. As is well known in the art, the OFDM signal is a multicarrier signal that comprises a plurality of subcarriers centered at different frequencies. The frequency spectrum of the subcarriers may overlap, as FIG. 2 illustrates. According to the OFDM transmission technique, data is transmitted on a plurality of subcarriers during an OFDM symbol interval. A given signal may be transmitted on every subcarrier of the multicarrier OFDM signal or only on given subcarriers, for example on every $N^{th}$ subcarrier. According to the latter scheme, the subcarriers of the multicarrier OFDM signal may be allocated to a plurality of different signals during the OFDM symbol interval. In FIG. 2, the subcarriers of the multicarrier OFDM signal have been allocated to three signals S1, S2, and S3. Signal S1 is located at subcarriers having center frequencies at f1, f4 and f7, signal S2 is located at subcarriers having center frequencies at f2, f5 and f8, and signal S3 is located at subcarriers having center frequencies at f3 and f6. One of the signals S1, S2, and S3 may be a desired signal the radio receiver 100 is attempting to detect for synchronization purposes, for example. Accordingly, the desired signal may be, for example, a synchronization signal or a pilot signal. In order to enable data transmission between a transmitter and a receiver, the receiver must detect a signal transmitted by the transmitter. When a signal, e.g. a synchronization signal, transmitted by the transmitter has been detected, the receiver activates other procedures required for the data reception. Such procedures may include synchronization to the synchronization signal, for example.

The performance of a signal detection scheme may be determined by the amount of correct signal detections relative to false alarms. A false alarm means that other signals, such as noise, has been detected as a desired signal (e.g. synchronization signal). In such case, the receiver attempts to synchronize to the wrong signal, or even to noise, which causes unnecessary operations in the receiver. As mentioned above, the signal detection is typically based on comparison of correlation properties of the received signal with a threshold value. On the basis of that comparison, the received signal is determined to be either a desired signal or noise. The threshold value should be set such that the signal detector on one hand is able to detect even weak signals but on the other hand minimizes false alarms, i.e. detection of noise as a desired signal. In order to reduce the computational complexity of a signal detection algorithm in a radio receiver, a generic threshold value that could be used regardless of a received signal reception power would be advantageous.

Figure 3:
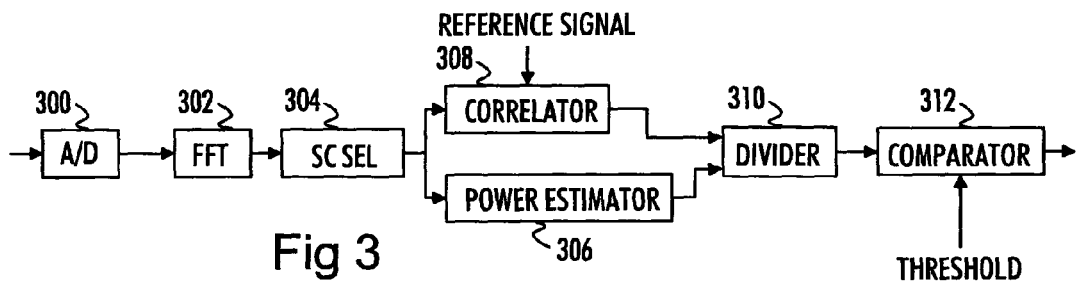
FIG. 3 illustrates signal detection carried out in the radio receiver according to an embodiment of the invention.

FIG. 3 illustrates a signal detection scheme according to an embodiment of the invention. A radio signal is received in a radio receiver (for example radio receiver 100). The received radio signal may be a multicarrier OFDM radio signal having the structure illustrated in FIG. 2 or it may be noise. The radio receiver 100 has no knowledge of that and, thus, it performs a signal detection procedure. The radio receiver 100 processes the received radio signal as if it were the multicarrier OFDM signal. Accordingly, different signals in the multicarrier OFDM signal would be allocated to different subcarriers of the multicarrier signal. The radio signal received through an antenna of the radio receiver 100 is first filtered, amplified, and converted to the baseband (not shown). Then, the received radio signal is analog-to-digital converted in an A/D-converter 300. The digitized radio signal is then transformed into a frequency domain through a Fourier transform in a Fourier transformer 302, thus producing a frequency domain representation of the received radio signal. The Fourier transform may be performed by utilizing a fast Fourier transform (FFT) algorithm.

The frequency domain representation of the received radio signal is then fed to a subcarrier selector 304, which selects a signal on specific one or more frequency components, or subcarriers, of the received radio signal. The signal on specific one or more frequency components is selected for signal detection. The subcarrier selector 304 may select, for example, those frequency components known to contain subcarriers carrying a synchronization signal or a pilot signal. Referring back to FIG. 2, let us assume that the radio receiver is attempting to detect a synchronization signal S1. Accordingly, the subcarrier selector 304 selects the frequency components having center frequencies of f1, f4, and f7 and bandwidths corresponding to the known OFDM subcarrier bandwidth. Accordingly, the radio receiver obtains a signal S having the frequency components f1, f4, and f7. The subcarrier selector 304 may select the desired frequency components, for example, by filtering out the undesired frequency components. It should be noted that the radio receiver may have knowledge of which frequency component or components should be checked for detection of the synchronization signal.

From the subcarrier selector 304, the signal S located at the selected frequency components is fed to a correlator 308 and to a power estimator 306. The correlator 308 correlates the signal received from the subcarrier selector 304 with a reference signal in order to calculate a correlation value. The reference signal may be stored previously in the memory unit 106 of the radio receiver 100. If the signal received from the subcarrier selector is S(n) and the reference signal is SR(n), both comprising N (n=1 to N) samples, the correlation value may be calculated according to the following equation:

$$C = \sum_N S(n)SR(n) \qquad (1)$$

The samples n may be frequency domain samples of signals S and SR. Therefore, frequency domain representation of signal S is correlated with the frequency domain representation of the reference signal SR. The correlator 308 then outputs the correlation value C. At this stage, it should be noted that the radio receiver 100 has the knowledge of the waveform of the transmitted synchronization signal it is attempting to detect and the reference signal has the corresponding waveform. In an ideal case when the received signal is actually the signal the radio receiver is attempting to detect, S(n)=SR(n). If the radio receiver 100 has no knowledge of the phase of the received signal S(n), the correlator 100 may calculate equation (1) with different time shifts between signals S(n) and SR(n) and select a maximum value. The correlator 308 may be of type known as a sliding correlator.

The power estimator 306 estimates the reception power of the signal S received from the subcarrier selector 304, i.e. the reception power of the signal S on the selected frequency components f1, f4, and f7. The power estimator 306 may calculate the reception power value P according to the following equation:

$$P = \sum_N |S(n)|^2 \qquad (2)$$

The power estimator 306 then outputs the calculated reception power value of the signal on the selected frequency components.

A divider 310 receives the correlation value C from the correlator 308 and the reception power value P from the power estimator 306. The divider 310 divides the correlation value C by the reception power value P, thereby normalizing the power of the correlation value C and, thus, removing the effect of the reception power on the correlation value C. As a result, the divider 310 outputs a decision metric which is fed to a comparator 312. The comparator 312 compares the decision metric to a threshold value in order to determine whether or not the received signal S has enough correlation with the reference signal SR. The threshold value may be stored previously in the memory unit 106. If the decision metric is higher than the threshold value, the comparator 312 determines that the received signal S is a desired signal (the synchronization signal S1). Accordingly, the comparator may output a signal which activates synchronization procedure in the radio receiver 100 such that the radio receiver 100 may start synchronizing itself to the synchronization signal. On the other hand, if the decision metric is lower than the threshold value, the comparator 312 determines that the received signal S is noise. Accordingly, the comparator 312 may output a signal which indicates that no desired signal was found in the received signal.

The power normalization carried out by the divider 310 together with the power estimator 306 simplifies the signal detection procedure such that the same, fixed threshold value may be applied regardless of the reception power of the received signal. Therefore, it is not necessary to calculate the threshold value separately for each signal detection procedure. This simplifies the signal detection procedure significantly.

In the embodiment described above by referring to FIG. 3, the correlation procedure and the reception power estimation procedure have been calculated to a signal located at a plurality of frequency components. This indicates that the plurality of frequency components have been processed jointly. As mentioned above, each subcarrier (frequency component) of the signal S1 the radio receiver 100 is attempting to detect carries one symbol during the OFDM symbol interval. Accordingly, signal S1 on subcarriers having center frequencies f1, f4, and f7 carries three symbols during the OFDM symbol interval. Therefore, signal S1 is a sum of three symbols. Correspondingly, the reference signal SR used in the correlation procedure may be a sum of three corresponding symbols.

Figure 4:
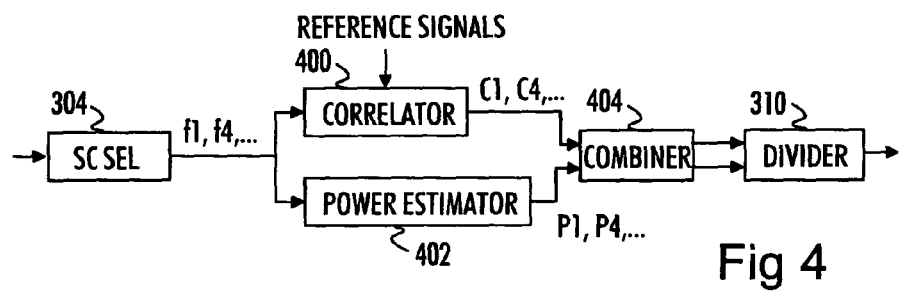
FIG. 4 illustrates signal detection carried out in the radio receiver according to another embodiment of the invention.

FIG. 4 illustrates another embodiment of the invention in which the frequency components selected by the subcarrier selector 304 are processed separately in a correlator 400 and in a power estimator 402. The correlator 400 correlates a signal on each selected frequency component separately with a corresponding reference signal, thereby producing as many correlation values as is the number of selected frequency components. Let us assume again that the subcarrier selector 304 has selected signal S on frequency components having center frequencies f1, f4, and f7. According to this embodiment of the invention, signal S is divided into signals S1, S2, and S3, each associated with a frequency component having the center frequency f1, f4, and f7, respectively. Then, the correlator 400 correlates each of the signals S1, S2, and S3 with corresponding reference signals SR1, SR2, and SR3, respectively. The correlation may be carried out according to equation (1). For example, signal S1 is correlated with a reference signal representing a signal known to be transmitted on a subcarrier having the center frequency f1. Accordingly, the correlator 400 outputs correlation values C1, C4, C7 associated with signals S1, S2, and S3, respectively.

Similarly, the power estimator 402 estimates the reception power of signal S separately for each frequency component, i.e. separately for signals S1, S2, and S3. The reception power estimation may be carried out according to equation (2). Accordingly, the power estimator 302 outputs reception power values P1, P4, P7 for signals S1, S2, and S3, respectively.

The correlation values C1, C4, and C7 and the reception power values P1, P4, and P7 are fed to a combiner 404, which combines the correlation values C1, C4, and C7 and the reception power values P1, P4, and P7 in order to produce one correlation value C and one reception power value P. The combiner 404 may simply be a summer which sums together the correlation values C1, C4, and C7. In the similar way, the combiner 404 may sum the reception power values P1, P4, and P7 together. The correlation value C and the reception power value is then fed to the divider 310 in order to produce the decision metric to enable the determination whether or not the received signal is the desired signal S1 or noise.

Figure 5:
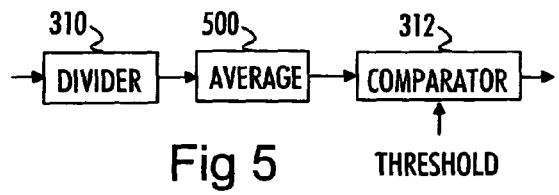
FIG. 5 illustrates signal detection carried out in the radio receiver according to still another embodiment of the invention.

FIG. 5 illustrates still another embodiment of the invention. If the same signal the radio receiver 100 is attempting to detect is transmitted with diversity, e.g. several times, the radio receiver 100 may improve the accuracy of the decision metric through averaging. The subcarrier selector 304 again selects the frequency components known to contain the desired signal (the synchronization signal). Accordingly, the subcarrier selector 304 may select the same frequency components for the newly received radio signal as were selected for the previously received radio signal. On the other hand, the subcarrier selector 304 may select frequency components for the newly received radio signal that are different from those selected for the previously received radio signal. For example, different frequency components at different times could be used in order to utilize frequency diversity, thereby increasing the performance of the signal detection procedure. A plurality of decision metrics, each associated with a different received radio signal, may be calculated according to any method described above and input from the divider 310 to an averaging unit 500. The averaging unit 500 may then calculate an average decision metric by averaging the plurality of received decision metrics. Averaging of the plurality of decision metrics improves the performance of the signal detection scheme. For example, if a firstly transmitted synchronization signal is weak due to severe fading in a radio channel, the received synchronization signal may not correlate sufficiently with the reference signal in order to be detected. But if the same synchronization signal transmitted thereafter has not suffered from the severe fading, this received synchronization signal correlates well with the reference signal and may raise the decision metric over the threshold level after averaging such that the synchronization signal is detected.

Figure 6:
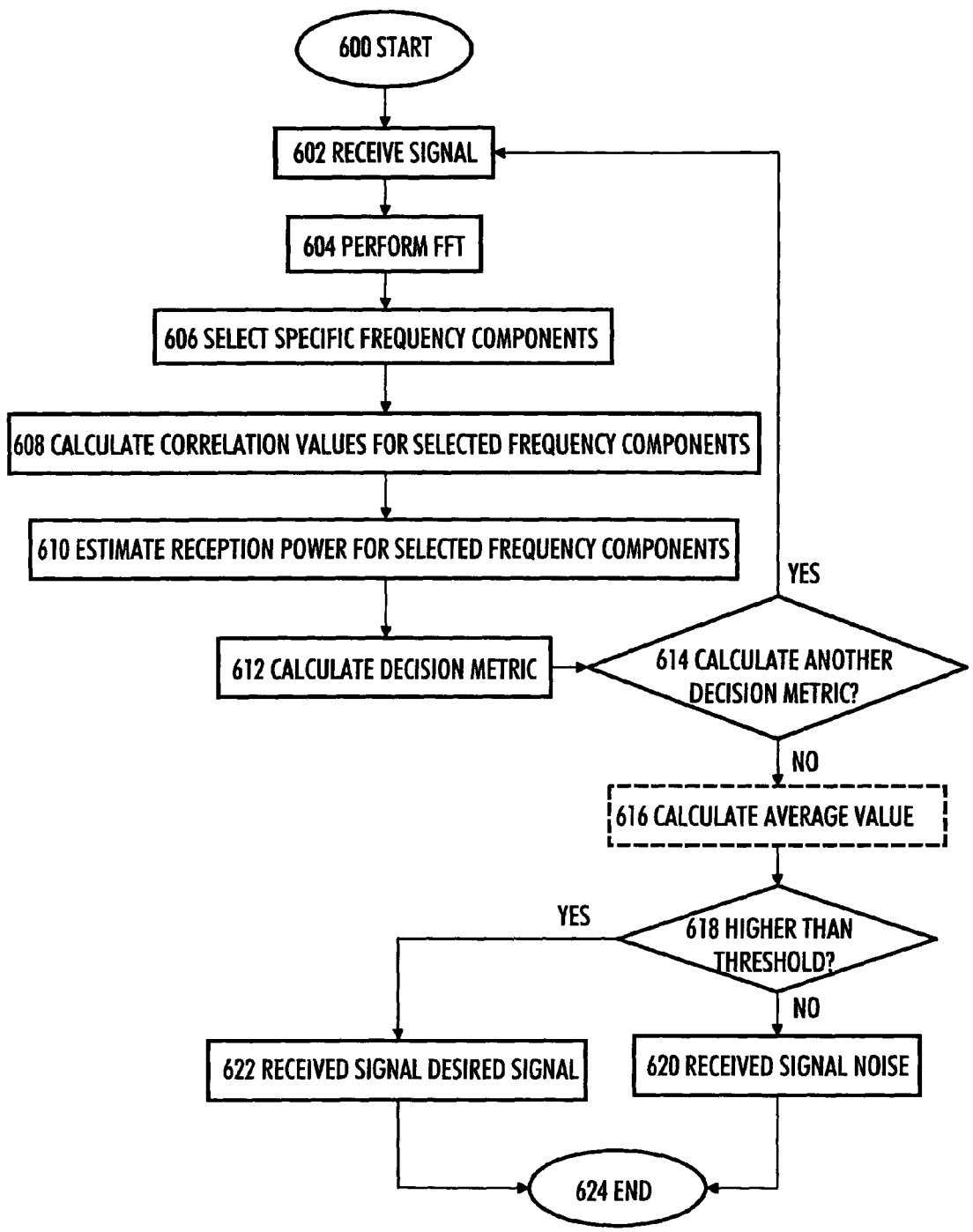
FIG. 6 is a flow diagram illustrating a signal detection process according to an embodiment of the invention.

Next, a signal detection process carried out in a radio receiver according to an embodiment of the invention will be described with reference to the flow diagram in FIG. 6. The process starts in block 600.

In block 602, a radio signal is received in the radio receiver. The received radio signal is transformed into a frequency domain through FFT in block 604, thus obtaining a frequency domain representation of the received radio signal. In block 606, specific one or more frequency components of the received and transformed radio signal are selected. If the radio receiver is attempting to detect a signal which is known to be transmitted on a plurality of subcarriers of a multicarrier signal, such as an OFDM signal, the frequency components corresponding to the subcarriers carrying the desired signal are selected.

In block 608, the signal on selected frequency components is compared with a reference signal, thereby obtaining a correlation value describing the similarity between the signal on selected frequency components and the reference signal. The correlation may be carried out by correlating a single signal comprising the selected frequency components with the corresponding reference signal. Alternatively, the correlation may be carried out by correlating each frequency component separately with a reference signal of the same frequency component. In the previous case, one correlation value is obtained while in the latter case, a plurality of correlation values are obtained. The plurality of correlation values may be combined according to a specific combining scheme.

In block 610, reception power values are calculated for the selected frequency components. Again, the reception power may be calculated by calculating the power of the signal representing every selected frequency component or the reception power may be calculated separately for each frequency component. In the latter case, the reception power values of the frequency components may be combined according to a specific combining scheme.

From the correlation value calculated in block 608 and the reception power value of the selected frequency components calculated in block 610, a decision metric is calculated in block 612. The decision metric may be calculated by dividing the correlation value by the reception power value, thereby normalizing the power of the correlation value, i.e. removing the effect of the reception power from the correlation value.

In block 614, it is determined whether or not to calculate another decision metric. If the radio receiver has the knowledge that the desired signal the radio receiver is attempting to detect is transmitted several times, the radio receiver may choose to take the advantage of this diversity transmission in order to improve the accuracy of the decision metric. If it is determined in block 614 that another decision metric is to be calculated, the process returns to block 602. If it is determined in block 614 that another decision metric will not be calculated, the process moves to block 616 where an average value of the calculated decision metrics is calculated. If only a single decision metric has been calculated, there is no need to execute block 616.

Then, the process moves to block 618 where the decision metric (or the average value of the decision metrics) is compared with a threshold value. If the decision metric is higher than the threshold value, the process moves to block 622 where it is determined that the received signal is the desired signal. On the other hand, if the decision metric is lower than the threshold value, the process moves to block 620 where it is determined that the received signal is noise. The process ends in block 624.

The embodiments of the invention may be realized in a radio receiver comprising a communication interface and a processing unit 104 operationally connected to the communication interface 108. The processing unit 104 may be configured to perform at least some of the steps described in connection with the flowchart of FIG. 6 and in connection with FIGS. 3 to 5. The embodiments may be implemented as a computer program comprising instructions for executing a computer process for signal detection in the radio receiver.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
receiving, in a radio receiver, a first signal through a radio channel, the first signal including a desired signal transmitted from a transmitter;
transforming the received first signal from a time domain into a frequency domain;
selecting specific one or more frequency components of the transformed first signal, wherein the specific one or more frequency components are known to carry the desired signal the radio receiver is attempting to detect, thereby obtaining a frequency domain representation of a signal located at the selected one or more frequency components;
correlating the frequency domain representation of the signal located at the selected one or more frequency components with a reference signal representing the desired signal the radio receiver is attempting to detect, thereby producing a correlation value describing similarity between the signal located at the selected one or more frequency components and the reference signal;
estimating a reception power value for the signal located at the selected one or more frequency components;
calculating a decision metric from the correlation value and the reception power value; and
determining, on the basis of the decision metric, whether the signal located at the selected one or more frequency components is the desired signal or noise.

2. The method of claim 1, wherein the decision metric is calculated by dividing the correlation value by the reception power value.

3. The method of claim 1, wherein the determination is carried out by comparing the decision metric with a fixed threshold value and deciding, on the basis of the comparison, whether the signal located at the selected one or more frequency components is the desired signal or noise.

4. The method of claim 3, wherein the signal located at the selected one or more frequency components is determined to be the desired signal, if the decision metric is higher than the fixed threshold value, and the signal located at the selected one or more frequency components is determined to be noise, if the decision metric is lower than the fixed threshold value.

5. The method of claim 1, wherein a frequency domain representation of the signal located at the selected one or more frequency components are correlated with a frequency domain representation of the reference signal.

6. The method of claim 5, wherein a plurality of frequency components is selected and the correlation, the reception power estimation, and the decision metric calculation are carried out for each frequency component separately, thereby obtaining a plurality of decision metrics, and the method further comprising combining the plurality of decision metrics.

7. The method of claim 1, wherein a plurality of frequency components is selected and the correlation, the reception power estimation, and the decision metric calculation are carried out for each frequency component separately, thereby obtaining a plurality of decision metrics, and the method further comprising combining the plurality of decision metrics.

8. The method of claim 1, further comprising:
receiving at least one other radio signal;
performing the same frequency component selection, correlation, reception power estimation and decision metric calculation operations for the at least one other radio signal as were performed for the received first signal, thereby obtaining a plurality of decision metrics; and
calculating an average value for the plurality of decision metrics.

9. The method of claim 8, wherein one or more frequency components that are at least partly different from the one that was selected for the first signal are selected for the received at least one other radio signal.

10. The method of claim 1, wherein the radio receiver is configured to receive multicarrier radio signals.

11. A radio receiver, comprising:
a communication interface configured to receive signals through a radio channel,
at least one processor; and
at least one memory including a computer program code, wherein the at least one memory and the computer program code are configured, with the at least one processor, to cause the radio receiver to:

receive, through the communication interface, a first signal including a desired signal transmitted from a transmitter, transform the received first signal from a time domain into a frequency domain, select specific one or more frequency components of the transformed first signal, wherein the specific one or more frequency components are known to carry a desired transmission signal the radio receiver is attempting to detect, thereby obtaining a frequency domain representation of a signal located at the selected one or more frequency components, correlate the frequency domain representation of the signal located at the selected one or more frequency components with a reference signal representing the desired transmission signal the radio receiver is attempting to detect, thereby producing a correlation value describing similarity between the signal located at the selected one or more frequency components and the reference signal, estimate a reception power value for the signal located at the selected one or more frequency components, calculate a decision metric from the correlation value and the reception power value, and determine, on the basis of the decision metric, whether the signal located at the selected one or more frequency components is the desired transmission signal or noise.

12. The radio receiver of claim 11, wherein the at least one memory and the computer program code are configured, with the at least one processor, to cause the radio receiver to calculate the decision metric by dividing the correlation value by the reception power value.

13. The radio receiver of claim 11, wherein the at least one memory and the computer program code are configured, with the at least one processor, to cause the radio receiver to carry out the determination by comparing the decision metric with a fixed threshold value and deciding, on the basis of the comparison, whether the signal located at the selected one or more frequency components is the desired signal or noise.

14. The radio receiver of claim 13, wherein the at least one memory and the computer program code are configured, with the at least one processor, to cause the radio receiver to determine that the signal located at the selected one or more frequency components is the desired signal, if the decision metric is higher than the fixed threshold value, and that the signal located at the selected one or more frequency components is noise, if the decision metric is lower than the fixed threshold value.

15. The radio receiver of claim 11, wherein the at least one memory and the computer program code are configured, with the at least one processor, to cause the radio receiver to receive, through the communication interface, a multicarrier signal.

16. The radio receiver of claim 11, wherein the at least one memory and the computer program code are configured, with the at least one processor, to cause the radio receiver to correlate a frequency domain representation of the signal located at the selected one or more frequency components with a frequency domain representation of the reference signal.

17. The radio receiver of claim 16, wherein the at least one memory and the computer program code are configured, with the at least one processor, to cause the radio receiver to select a plurality of frequency components and carry out the correlation, the reception power estimation, and the decision metric calculation for each frequency component separately, thereby obtaining a plurality of decision metrics, and to combine the plurality of decision metrics.

18. The radio receiver of claim 11, wherein the at least one memory and the computer program code are configured, with the at least one processor, to cause the radio receiver to select a plurality of frequency components and carry out the correlation, the reception power estimation, and the decision metric calculation for each frequency component separately, thereby obtaining a plurality of decision metrics, and to combine the plurality of decision metrics.

19. The radio receiver of claim 11, wherein the at least one memory and the computer program code are configured, with the at least one processor, to cause the radio receiver to receive, through the communication interface, at least one other signal, perform the same frequency component selection, correlation, reception power estimation and decision metric calculation operations for the at least one other signal as were performed for the received first signal, thereby obtaining a plurality of decision metrics and to calculate an average value for the plurality of decision metrics.

20. The radio receiver of claim 19, wherein the at least one memory and the computer program code are configured, with the at least one processor, to cause the radio receiver to select one or more frequency components that are at least partly different from the one that was selected for the first signal are selected for the received at least one other signal.

21. A mobile terminal for use in a wireless communication network, the mobile terminal comprising:

at least one processor; and at least one memory including a computer program code, wherein the at least one memory and the computer program code are configured, with the at least one processor, to cause the mobile terminal to receive a first signal through a radio channel, the first signal including a desired signal transmitted from a transmitter, transform the received first signal from a time domain into a frequency domain, select specific one or more frequency components of the transformed first signal, wherein the specific one or more frequency components are known to carry a desired signal the radio receiver is attempting to detect, thereby obtaining a frequency domain representation of a signal located at the selected one or more frequency components, correlate the frequency domain representation of the signal located at the selected one or more frequency components with a reference signal representing the desired signal the radio receiver is attempting to detect, thereby producing a correlation value describing similarity between the signal located at the selected one or more frequency components and the reference signal, estimate a reception power value for the signal located at the selected one or more frequency components, calculate a decision metric from the correlation value and the reception power value, and determine, on the basis of the decision metric, whether the signal located at the selected one or more frequency components is the desired signal or noise.

22. A radio receiver, comprising:

means for receiving a first signal through a radio channel, the first signal including a desired signal transmitted from a transmitter;

means for transforming the received first signal from a time domain into a frequency domain;

means for selecting specific one or more frequency components of the transformed first signal, wherein the specific one or more frequency components are known to carry a desired signal the radio receiver is attempting to detect, thereby obtaining a frequency domain representation of a signal located at the selected one or more frequency components;

means for correlating the frequency domain representation of the signal located at the selected one or more frequency components with a reference signal representing the desired signal the radio receiver is attempting to detect, thereby producing a correlation value describing similarity between the signal located at the selected one or more frequency components and the reference signal;

means for estimating a reception power value for the signal located at the selected one or more frequency components;

means for calculating a decision metric from the correlation value and the reception power value; and means for determining, on the basis of the decision metric, whether the signal located at the selected one or more frequency components is the desired signal or noise.

23. A computer program distribution medium readable by a computer and encoding a computer program of instructions for executing a computer process for signal detection in a radio receiver, the process comprising:

receiving a first signal including a desired signal transmitted from a transmitter;

transforming the received first signal from a time domain into a frequency domain;

selecting specific one or more frequency components of the transformed first signal, wherein the specific one or more frequency components are known to carry a desired signal the radio receiver is attempting to detect, thereby obtaining a frequency domain representation of a signal located at the selected one or more frequency components;

correlating the frequency domain representation of the signal located at the selected one or more frequency components with a reference signal representing the desired signal the radio receiver is attempting to detect, thereby producing a correlation value describing similarity between the signal located at the selected one or more frequency components and the reference signal;

estimating a reception power value for the signal located at the selected one or more frequency components;

calculating a decision metric from the correlation value and the reception power value; and determining, on the basis of the decision metric, whether the signal located at the selected one or more frequency components is the desired signal or noise.

24. The computer program distribution medium of claim 23, the distribution medium including at least one of the following media: a computer readable medium, a program storage medium, a record medium, and a computer readable memory.

25. The method of claim 1, further comprising activating a synchronization procedure upon determining that the signal located at the selected one or more frequency components is the desired signal.

26. The radio receiver of claim 11, wherein the processing unit is further configured to activate a synchronization procedure upon determining that the signal located at the selected one or more frequency components is the desired signal.

* * * * *